United States Patent
Park et al.

(10) Patent No.: US 12,230,277 B2
(45) Date of Patent: Feb. 18, 2025

(54) METHOD OF GENERATING SUMMARY BASED ON MAIN SPEAKER

(71) Applicant: ActionPower Corp., Seoul (KR)

(72) Inventors: Seongmin Park, Seoul (KR); Seungho Kwak, Seoul (KR)

(73) Assignee: ActionPower Corp., Seoul (KR)

( * ) Notice: Subject to any disclaimer, the term of this patent is extended or adjusted under 35 U.S.C. 154(b) by 110 days.

(21) Appl. No.: 17/962,011

(22) Filed: Oct. 7, 2022

(65) Prior Publication Data

US 2023/0419968 A1    Dec. 28, 2023

(30) Foreign Application Priority Data

Jun. 27, 2022 (KR) .................. 10-2022-0078041

(51) Int. Cl.
*G10L 15/26* (2006.01)
(52) U.S. Cl.
CPC .................... *G10L 15/26* (2013.01)
(58) Field of Classification Search
CPC .......... G10L 15/26; G10L 17/02; G10L 25/78
See application file for complete search history.

(56) References Cited

U.S. PATENT DOCUMENTS

| | | | |
|---|---|---|---|
| 10,986,046 B2 | 4/2021 | Kim | |
| 11,232,266 B1 * | 1/2022 | Biswas | G06F 40/35 |
| 2015/0348538 A1 * | 12/2015 | Donaldson | G10L 15/26 |
| | | | 704/235 |
| 2018/0342240 A1 | 11/2018 | Shellef et al. | |
| 2022/0171936 A1 * | 6/2022 | Wang | G06F 40/289 |

FOREIGN PATENT DOCUMENTS

| | | |
|---|---|---|
| JP | 202263939 A | 4/2022 |
| KR | 101889809 B1 | 8/2018 |
| KR | 1020190096304 | 8/2019 |
| KR | 102069695 B1 | 1/2020 |
| KR | 20200063346 | 6/2020 |
| KR | 102298330 B1 | 9/2021 |
| KR | 102365611 | 2/2022 |

OTHER PUBLICATIONS

Bak et al., Bert, A Leader's Final Decision Classification Model Tested on Meeting Records with Bert, ISSN 2383-630X (print) ISSN 2383-6296 (online), Journal of KIISE, vol. 48, No. 5, pp. 568-574, May 2021, 7 pgs.

* cited by examiner

*Primary Examiner* — Angela A Armstrong
(74) *Attorney, Agent, or Firm* — Fish IP Law, LLP; Tomas A. Prieto

(57) ABSTRACT

Disclosed are a method, a device, and a program for selecting a main speaker among speakers included in a sound source or a conversation record based on the sound source or the conversation record including conversation contents of at least one speaker and generating a summary based on the main speaker. A method of generating a summary for a sound source, the method being performed by at least one computing device, includes: generating a speak score for at least one speaker based on the sound source; determining a main speaker of the sound source based on a speak score for said at least one speaker; and generating a summary for the sound source in consideration of the determined main speaker.

9 Claims, 11 Drawing Sheets

METHOD OF GENERATING SUMMARY BASED ON MAIN SPEAKER

CROSS-REFERENCE TO RELATED APPLICATIONS

This application claims priority to and the benefit of Korean Patent Application No. 10-2022-0078041 filed in the Korean Intellectual Property Office on Jun. 27, 2022, the entire contents of which are incorporated herein by reference.

TECHNICAL FIELD

The present disclosure relates to a method of generating a summary, and more particularly, to a method of providing a summary based on a sound source or a conversation record including conversation contents of at least one speaker.

BACKGROUND ART

Today, modern people are exposed to an excessive amount of information. However, not all information is useful to each person, and even though the information is useful, unorganized information is difficult to put into practice, so a lot of manpower is consumed in refining the information.

For example, when it is necessary to summarize an organization's meetings, because it requires cumbersome work to record the contents of a conversation or generate a conversation record, and to generate a summary by refining the contents of the conversation or the conversation record, in the related art, various attempts have been made based on a neural network model to automate the aforementioned task of generating the summary.

However, since the related art equally considers the speak of a plurality of speakers in summarizing a conversation, the importance of a specific speak may not be considered, and thus the quality of the summary may be deteriorated.

Therefore, there is a need for a new method in which a summary is generated based on a sound source, but the importance of specific speak is considered (for example, a method of measuring importance for each speaker and generating a summary based on the importance).

On the other hand, the present disclosure has been derived based on at least the technical background discussed above, but the technical problem or purpose of the present disclosure is not limited to solve the problems or disadvantages discussed above. That is, the present disclosure may cover various technical issues related to the content to be described below in addition to the technical issues discussed above.

SUMMARY OF THE INVENTION

The present disclosure has been conceived in response to the foregoing background art, and has been made in an effort to provide a technology of determining a main speaker of a sound source or a conversation record, and generating a summary based on the determined main speaker.

On the other hand, the technical problem to be achieved by the present disclosure is not limited to the technical problem mentioned above, and various technical problems may be included within the range obvious to those skilled in the art from the content to be described below.

In order to solve the foregoing object, an exemplary embodiment of the present disclosure discloses a method of generating a summary for a sound source, the method being performed by at least one computing device, the method including: generating a speak score for at least one speaker based on the sound source; determining a main speaker of the sound source based on a speak score for said at least one speaker; and generating a summary for the sound source in consideration of the determined main speaker.

In an alternative exemplary embodiment, the generating of the speak score for said at least one speaker may include an operation of calculating the speak score based on at least one of: a frequency of the speak for said at least one speaker; and the degree of dispersion of the speak for said at least one speaker.

In the alternative exemplary embodiment, the generating of the speak score for said at least one speaker may include: calculating a number of clustered feature vectors in relation to one or more speaks of each speaker; calculating a frequency of speaks for each speaker based on the number of clustered feature vectors; and generating a speak score for each speaker based on the calculated frequency of speaks.

In the alternative exemplary embodiment, the generating of the speak score for said at least one speaker may include: calculating the degree of dispersion for one or more speaks of each speaker; and generating a speak score for each speaker based on the calculated degree of dispersion of the speaks.

In the alternative exemplary embodiment, the calculating of the degree of dispersion for one or more speaks of each speaker may further include: identifying one or more speak indices for each speaker in a script generated based on the sound source; and calculating the degree of dispersion for one or more speaks of each speaker based on the identified one or more speak indices.

In the alternative exemplary embodiment, the generating of the speak score for said at least one speaker may further include: calculating a frequency of speaks for each speaker in the sound source; calculating the degree of dispersion of the speaks for each speaker in the sound source; and generating a speak score for each speaker based on a weighted value sum of the calculated frequency of speaks and the calculated degree of dispersion of the speak.

In the alternative exemplary embodiment, the generating of the speak score for said at least one speaker may further include distinguishing a plurality of speakers associated with the sound source from each other.

In the alternative exemplary embodiment, the distinguishing the plurality of speakers associated with the sound source from each other may include at least one of: extracting feature vectors for the speaks included in the sound source; and distinguishing the plurality of speakers from each other based on the clustering of the extracted feature vectors.

In the alternative exemplary embodiment, the generating of the summary for the sound source in consideration of the determined main speaker may include generating a summary of the sound source by assigning a weighted value to the speaks associated with the determined main speaker among the speaks included in the sound source.

In the alternative exemplary embodiment, the sound source may be converted into a plurality of tokens, and the generating of the summary of the sound source by assigning the weighted value to the speak associated with the determined main speaker may further include: assigning a weighted value to the token associated with the determined main speaker; selecting some tokens from among the plurality of tokens in consideration of the weighted value; generating a sentence to be included in the summary based on the selected some tokens; and generating the summary based on the generated sentence.

In the alternative exemplary embodiment, the sound source may be converted into a language graph including a plurality of nodes, and the generating of the summary of the sound source by assigning the weighted value to the speak associated with the determined main speaker may further include: assigning a weighted value to a node associated with the determined main speaker; selecting some nodes from among the plurality of nodes in consideration of the weighted value; generating a sentence to be included in the summary based on the selected some nodes; and generating the summary based on the generated sentence.

In the alternative exemplary embodiment, the sound source may be converted into a plurality of sentences, and the generating of the summary of the sound source by assigning the weighted value to the speak associated with the determined main speaker may further include: assigning a weighted value to a sentence associated with the determined main speaker; extracting some sentences from among the plurality of sentences in consideration of the weighted value; and generating the summary based on the extracted some sentences.

In order to solve the foregoing object, another exemplary embodiment of the present disclosure discloses a device, including: at least one processor; and a memory, in which the processor generates a speak score for at least one speaker based on a sound source, determines a main speaker of the sound source based on the speak score for said at least one speaker, and generates a summary for the sound source in consideration of the determined main speaker.

In order to solve the foregoing object, another exemplary embodiment of the present disclosure discloses a computer program stored in a computer-readable storage medium, the computer program performing operations for generating a summary for a sound source, the operations including: an operation of generating a speak score for at least one speaker based on a sound source; an operation of determining a main speaker of the sound source based on the speak score for said at least one speaker; and an operation of generating a summary for the sound source in consideration of the determined main speaker.

According to the present disclosure, it is possible to select a main speaker among speakers included in a sound source or a conversation record based on the sound source or the conversation record including conversation contents of at least one speaker and to generate a summary based on the selected main speaker. Accordingly, according to the present disclosure, it is possible to generate a summary by reflecting speak contents of the main speaker, thereby improving a quality of the summary.

On the other hand, the effect of the present disclosure is not limited to the above-mentioned effects, and various effects may be included within the range apparent to those skilled in the art from the content to be described below.

DETAILED DESCRIPTION

Figure 1:
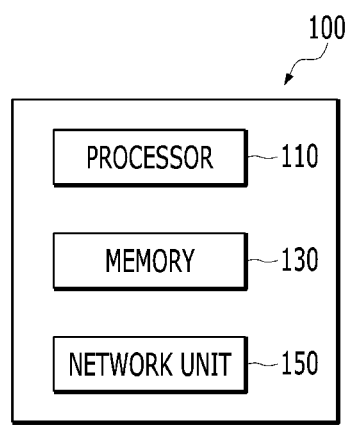
FIG. 1 is a block diagram of a computing device performing operations according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

The configuration of a computing device 100 illustrated in FIG. 1 is merely a simplified example. In the exemplary embodiment of the present disclosure, the computing device 100 may include other configurations for performing a computing environment of the computing device 100, and only some of the disclosed configurations may also configure the computing device 100.

The computing device 100 may include a processor 110, a memory 130, and a network unit 150.

The processor 110 may be formed of one or more cores, and may include a processor, such as a central processing unit (CPU), a general purpose graphics processing unit (GPGPU), and a tensor processing unit (TPU) of the computing device, for performing a data analysis and deep learning. The processor 110 may read a computer program stored in the memory 130 and process data for machine learning according to an exemplary embodiment of the present disclosure. According to the exemplary embodiment of the present disclosure, the processor 110 may perform calculation for training a neural network. The processor 110 may perform a calculation, such as processing of input data for training in Deep Learning (DL), extraction of a feature from input data, an error calculation, and updating of a weight of the neural network by using backpropagation, for training the neural network. At least one of the CPU, GPGPU, and TPU of the processor 110 may process training of a network function. For example, the CPU and the GPGPU may process training of the network function and data classification by using a network function together. Further, in the exemplary embodiment of the present disclosure, the training of the network function and the data classification by using a network function may be processed by using the processors of the plurality of computing devices together. Further, the computer program executed in the computing device according to the exemplary embodiment of the present disclosure may be a CPU, GPGPU, or TPU executable program.

According to the exemplary embodiment of the present disclosure, the memory 130 may store a predetermined type of information generated or determined by the processor 110 and a predetermined type of information received by a network unit 150.

According to the exemplary embodiment of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device 100 may also be operated in relation to web storage performing a storage function of the memory 130 on the Internet. The description of the foregoing memory is merely illustrative, and the present disclosure is not limited thereto.

The network unit 150 according to several exemplary embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 110 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

Figure 2:
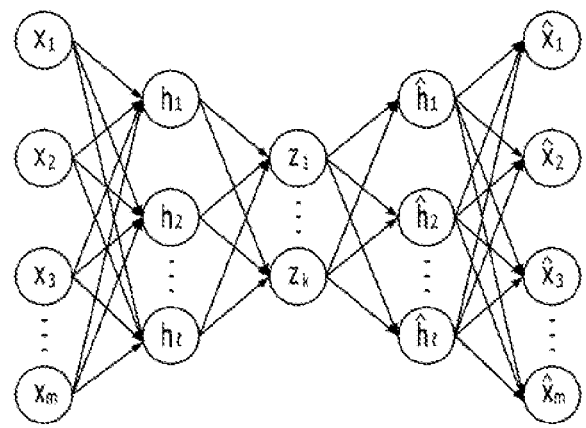
FIG. 2 is a schematic diagram illustrating a neural network model according to an exemplary embodiment of the present disclosure.

FIG. 2 is a schematic diagram illustrating a neural network model according to an exemplary embodiment of the present disclosure.

Throughout the present specification, a neural network model, and a neural network may be used with the same meaning. A neural network model may generally be composed of a set of interconnected computational units, which may be referred to as nodes. The "nodes" may also be called "neurons". The neural network model is composed of one or more nodes. Nodes (or neurons) constituting the neural network models may be interconnected by one or more links.

In the neural network model, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weighted value (in this case, parameters and weighted values may be used in the same meaning throughout the present disclosure). The weighted value is variable, and in order for the neural network model to perform a desired function, the weighted value may be varied by a user or an algorithm. For example, when one or more input nodes are connected to one output node by links, respectively, a value of the output node may be determined based on values input to the input nodes connected to the output node and weighted values set in the link corresponding to each of the input nodes.

As described above, in the neural network model, one or more nodes are connected with each other through one or more links to form a relationship of an input node and an output node in the neural network. A characteristic of the neural network model may be determined according to the number of nodes and links in the neural network, a correlation between the nodes and the links, and a value of the weighted value assigned to each of the links. For example, when there are two neural network models in which the numbers of nodes and links are the same and the weighted values between the links are different, the two neural network models may be recognized to be different from each other.

The neural network model may consist of a set of one or more nodes. A subset of the nodes configuring the neural network may form a layer. Some of the nodes configuring the neural network model may form one layer on the basis of distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network model. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network model, not the initial input node and the final output node.

The neural network model may be trained by at least one scheme of supervised learning, unsupervised learning, semi-supervised learning, and reinforcement learning. The training of the neural network model may be a process of applying knowledge for the neural network model to perform a specific operation to the neural network model.

The neural network model may be trained in a direction of minimizing an error of an output. In the training of the neural network model, training data is repeatedly input to the neural network model and an error of an output of the neural network model for the training data and a target is calculated, and the error of the neural network model is back-propagated in a direction from an output layer to an input layer of the neural network model in order to decrease the error, and a weighted value of each node of the neural network model is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network model and the output (category) of the neural network model is compared with the label of the training data to calculate an error. For another example, in the case of the unsupervised learning related to the data classification, training data that is the input is compared with an output of the neural network model, so that an error may be calculated. The calculated error is back-propagated in a reverse direction (that is, the direction from the output layer to the input layer) in the neural network model, and a connection weighted value of each of the nodes of the layers of the neural network model may be updated according to the backpropagation. A change amount of the updated connection weighted value of each node may be determined according to a learning rate. The calculation of the neural network model for the input data and the backpropagation of the error may configure a learning epoch. The learning rate is differently applicable according to the number of times of repetition of the learning epoch of the neural network model. For example, at the initial stage of the learning of the neural network model, a high learning rate is used to make the neural network model rapidly secure performance at a predetermined level and improve efficiency, and at the latter stage of the learning, a low learning rate is used to improve accuracy.

In the training of the neural network model, the training data may be generally a subset of actual data (that is, data to be processed by using the trained neural network models), and thus an error for the training data is decreased, but there may exist a learning epoch, in which an error for the actual data is increased. Overfitting is a phenomenon, in which the neural network model excessively learns training data, so that an error for actual data is increased. For example, a phenomenon, in which the neural network model learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the learning process, a method using a bath normalization layer, and the like may be applied.

According to the exemplary embodiment of the present disclosure, a computer readable medium storing a data structure is disclosed.

The data structure may mean organization, management, and storage of data that enables efficient access and correction of the data. The data structure may mean organization of the data for solving a specific problem (for example, data search, data storage, and data correction in the shortest time). The data structure may also be defined as a physical or logical relation between data elements designed so as to support a specific data processing function. The logical relation between the data elements may include a connection relation between the data elements considered by the user. The physical relation between the data elements may include an actual relation between the data elements physically stored in the computer readable storage medium (for example, a hard disk). The data structure may particularly include a set of data, a relation between data, and a function or a command applicable to data. The computing device may perform the computation by minimally using the resources of the computing device through the effectively designed data structure. Particularly, the computing device may improve efficiency of computation, reading, insertion, deletion, comparison, exchange, and search through the effectively designed data structure.

The data structure may be divided into a linear data structure and a nonlinear data structure according to the form of the data structure. The linear data structure may be a structure in which only one data is connected after one data. The linear data structure may include a list, a stack, a queue, and a dequeue. The list may mean a series of data sets that are internally ordered. The list may include a linked list. The linked list may be a data structure in which each data is connected in a line with a pointer. The pointer in the linked list may include link information with next or previous data. The linked list may be expressed as a single linked list, a dual-linked list, a circular linked list according to the form. The stack may be a data listing structure limitedly accessible to data. The stack may be a linear data structure that may process (for example, insert or delete) data only at one end of the data structure. The data stored in the stack may be a data structure (Last in First Out (LIFO)), in which the later the data is stored, the faster the data comes out. The queue is a data listing structure limitedly accessible to data, and may be a data structure (First in First Out (FIFO)), in which the later the data is stored, the later the data comes out, unlike the stack. The dequeue may be a data structure that may process data at both ends of the data structure.

The nonlinear data structure may be the structure in which the plurality of data is connected after one data. The nonlinear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

The data structure may include a neural network. The data structure including the neural network may be stored in a computer readable medium. The data structure including the neural network may also include data input to the neural network, a weight of the neural network, a hyper parameter of the neural network, data obtained from the neural network, an active function associated with each node or layer of the neural network, and a loss function for training the neural network. The data structure including the neural network may include predetermined constituent elements among the disclosed configurations. That is, the data structure including the neural network may be formed of the entirety or a predetermined combination of data input to the neural network, a weight of the neural network, a hyper parameter of the neural network, data obtained from the neural network, an active function associated with each node or layer of the neural network, a loss function for training the neural network, and the like. In addition to the foregoing configurations, the data structure including the neural network may include other predetermined information determining a characteristic of the neural network. Further, the data structure may include any type of data used or generated in the computation process of the neural network, and is not limited to the foregoing matters. The computer readable medium may include a computer readable recording medium and/or a computer readable transmission medium. The neural network may be formed of a set of mutually connected calculation units which may be generally referred to as nodes. The nodes may also be referred to as neurons. The neural network includes one or more nodes.

The data structure may include data input to the neural network. The data structure including the data input to the neural network may be stored in the computer readable medium. The data input to the neural network may include training data input in the neural network training process and/or input data input to the neural network which is completely trained. The data input to the neural network may include preprocessed data and/or data to be preprocessed. The preprocessing may include a data processing process for inputting data to the neural network. Accordingly, the data structure may include the data to be processed and the data generated by the preprocessing. The foregoing data structure is merely an example, and the present disclosure is not limited thereto.

The data structure may include a weight of the neural network (in the present specification, the weight and the parameter may be used as the same meaning). Further, the data structure including the weight of the neural network may be stored in the compute readable medium. The neural network may include a plurality of weights. The weight may be variable, and in order for the neural network to perform a desired function, the weighted may be varied by a user or an algorithm. For example, when one or more input nodes are connected to one output node by links, respectively, the output node may determine an output node value based on the values input to the input nodes connected with the output node and a parameter set in the link corresponding to each of the input nodes. The foregoing data structure is merely an example, and the present disclosure is not limited thereto.

As a non-limited example, the weight may include a weight varied in a neural network training process and/or a weight when the neural network is completely trained. The weight varied in the neural network training process may include a weight at the start time of a training cycle and/or a weight varied during the training cycle. The weight when the neural network is completely trained may include a weight when the training cycle is completed. Accordingly, the data structure including the weight of the neural network may include a data structure including a weight varied in the neural network training process and/or a weight when the neural network is completely trained. Accordingly, it is determined that the weight and/or a combination of the respective weights are included in the data structure including the weight of the neural network. The foregoing data structure is merely an example, and the present disclosure is not limited thereto.

The data structure including the weight of the neural network may be stored in a computer readable storage medium (for example, a memory and a hard disk) after being subjected to a serialization process. The serialization may be the process of storing the data structure in the same or different computing device and converting the data structure into a form that may be reconstructed and used later. The computing device may serialize the data structure and transceive data through a network. The serialized data structure including the weight of the neural network may be reconstructed in the same computing device or the different computing device through deserialization. The data structure including the weight of the neural network is not limited to the serialization. Further, the data structure including the weight of the neural network may include a data structure (for example, B-Tree, Trie, m-way search tree, AVL tree, and Red-Black Tree in the nonlinear data structure) for improving efficiency of the computation while minimally using the resources of the computing device. The foregoing matter is merely an example, and the present disclosure is not limited thereto.

The data structure may include a hyper-parameter of the neural network. Further, the data structure including the hyper-parameter of the neural network may be stored in the computer readable medium. The hyper-parameter may be a variable varied by a user. The hyper-parameter may include, for example, a learning rate, a cost function, the number of times of the repetition of the training cycle, weight initialization (for example, setting of a range of a weight that is the target of the weight initialization), and the number of hidden units (for example, the number of hidden layers and the number of nodes of the hidden layer). The foregoing data structure is merely an example, and the present disclosure is not limited thereto.

Figure 3:
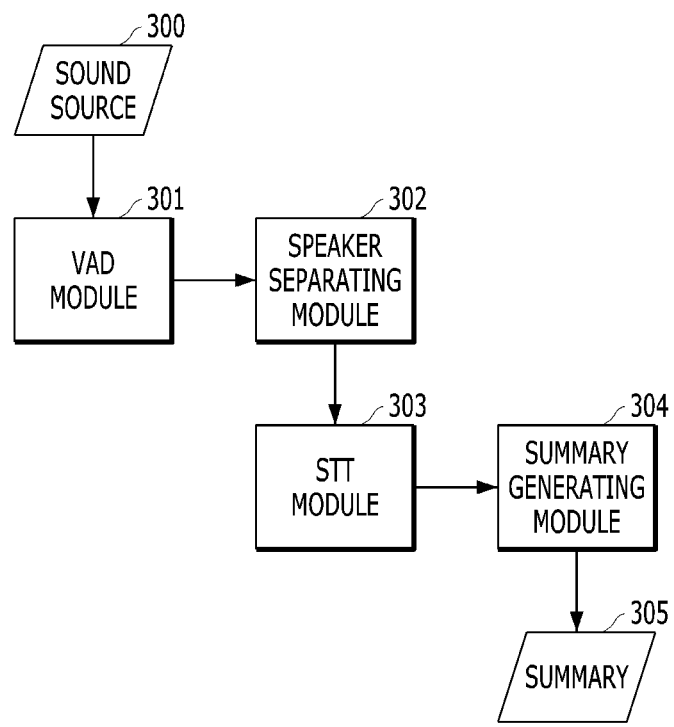
FIG. 3 is a schematic diagram illustrating a method of generating a summary based on a sound source.

FIG. 3 is a schematic diagram illustrating a general process of a method of generating a summary based on a sound source.

A general process of a method of generating a summary 305 based on a sound source 300 is now described with reference to FIG. 3.

First, the sound source 300 may include speak of at least one speaker. In this case, throughout the present disclosure, the speak means a voice of a person generated by a speaker, and sounds other than the speak included in the sound source 300 may be expressed as noise. In addition, the summary 305 may mean that the core speaks of the conversation (for example, meeting, discussion, call, and interview) included in the sound source 300 are compressed and organized for the user to easily understand.

In the method of generating the summary 305 based on the sound source 300, speak of which a speaker is not separated may be extracted from the sound source 300 by using a Voice Activity Detection (VAD) module 301 (for example, the VAD module 301 may correspond to Webrtc-VAD). Subsequently, the method may classify the speak in which the speaker is not separated into speak in which at least one speaker is separated (hereinafter, referred to as the speak) by using a speaker separation module 302. Subsequently, the method may convert the speak composed of the sound into text by using a Sound To Text (STT) module 303 to generate a script. For example, the STT module 303 may correspond to a transformer-based neural network that receives voice or a spectrogram converted from voice and outputs a character string. Finally, the summary 305 in which the script is summarized may be generated by using a summary generation module 304.

In this case, the VAD module may correspond to a module for classifying the speak and noise from the sound source 300. For example, the VAD module 301 receives the sound source 300, and repeat a binary classification algorithm in which when the speak of the speaker is recognized at a predetermined interval of the sound source 300 (for example, an interval in an executed program or an interval at which an internal function is executed), the VAD module 301 outputs "1, and in the opposite case, the VAD module 4301 outputs "0". For example, when the VAD module 301 executes the used binary classification algorithm once per second of the sound source 300, a total of 10 times (that is, 10 times within 0:01 to 0:10), a numerical progression of [(0,1), (1, 1), (2, 0), (3, 0), (4, 1), (5, 1), (6, 1), (7, 1), (8, 1), (9, 0)] may be output. At this time, in the numerical progression, the user may determine "Elements 1 to 2" and "Elements 5 to 9" (that is [(0, 1), (1, 1)] and [(5, 1)), (6, 1), (7, 1), (8, 1)]) as two different speak. Further, the VAD module 301 may further include a probability distribution-based classification algorithm for determining whether the distribution is similar to the speak or the noise based on the distribution of the speak and the distribution of the noise.

The speaker separation module 302 may correspond to a module for classifying which speaker is the subject of each speak in the input sound source 300. For example, the speaker separation module 302 may extract a feature of at least one speaker by using a speaker feature extractor based on "the sound source 300 in which the speak and the noise are classified" output from the VAD module 301. Then, the subject of each speak may be classified by clustering each speak based on the feature of the speaker. In this case, the clustering may include an operation of expressing at least one speak in a latent space having a plurality of dimensions in which the feature of the speaker is set as each edge, and classifying the speak adjacent to each other in the latent space into a cluster. However, the clustering is not limited to the above operation and may be implemented in various ways.

The STT module 303 may correspond to a module for generating a script by converting the speak of which the speaker is classified into text. For example, the STT module 303 may receive the speak, extract a feature of the speak, and generate text based on the feature of the speak The summary generating module 304 may correspond to a module generating the summary 305 based on the speak or the text including the speak contents. In this case, when the speak of the voice is based, unlike the method of generating the summary 305 based on the text including the contents of the speak, feature information of the speaker may be extracted (speaker embedding extract) and the feature information may be considered in the summary process by using the neural network model, such as ResNet, Res2Net, and ECAPA-TDNN.

The method for generating a summary according to the exemplary embodiment of the present disclosure, which will be described below, may be implemented in a form including the plurality of modules, and may include additional modules for implementing additional technical elements according to the present disclosure. In addition, the method according to the exemplary embodiment of the present disclosure, which will be described later, may also be implemented in a form including modules other than the plurality of modules.

The method of generating the summary according to the exemplary embodiment of the present disclosure may generate a summary in consideration of feature information of a speaker. For example, in the method of generating the summary according to the exemplary embodiment of the present disclosure, a main speaker may be determined with respect to a sound source to be analyzed, and a weighted value is assigned to the speak of the determined main speaker to generate a summary.

As mentioned above, the related art does not consider the main speaker with high importance in the conversation when generating the summary from the sound source. For example, in generating the summary, the related arts analyze the importance of contents included in the "speak itself" or analyze a hierarchical relationship between speak without considering the feature information of the "speaker itself" (for example, who the main speaker is). Thus, the related arts cannot generate the summary in consideration of the "main speaker". For example, at a company executive meeting, the CEO's speak with high frequency of speaks should be evaluated as key contents, but the related arts that do not consider the main speaker have difficulty to reflect the context when generating a summary.

In the method for generating the summary according to the exemplary embodiment of the present disclosure, the main speaker may be determined by directly analyzing speak included in the sound source. Accordingly, in the method for generating the summary according to the exemplary embodiment of the present disclosure, even though there is no additional information about the speaker (for example, the speaker's age, position, and professionalism), the main speaker may be determined by analyzing the sound source itself.

The "main speaker" may be determined to be a specific speaker who has a high frequency of speaks in the sound source or whose speak is widely dispersed throughout the sound source. This is because the speaker with the features is more likely to be the speaker who plays an important role in the conversation. For example, the speaker with the features is more likely to be the speaker who raises questions and organizes the opinions of the rest of the speakers at the meeting, and is more likely to be the speaker who leads the meeting by actively participating in the meeting. Meanwhile, the method of determining the main speaker may be determined by various methods other than the method described above.

Hereinafter, the exemplary embodiment of the method of generating the summary in consideration of the main speaker from the sound source performed by the processor 110 will be disclosed with reference to FIG. 4. The method of generating the summary may include operations S400 to S402 and sub-operations of the operations. In addition, the method of generating the summary may include various operations in addition to the foregoing operations.

Figure 4:
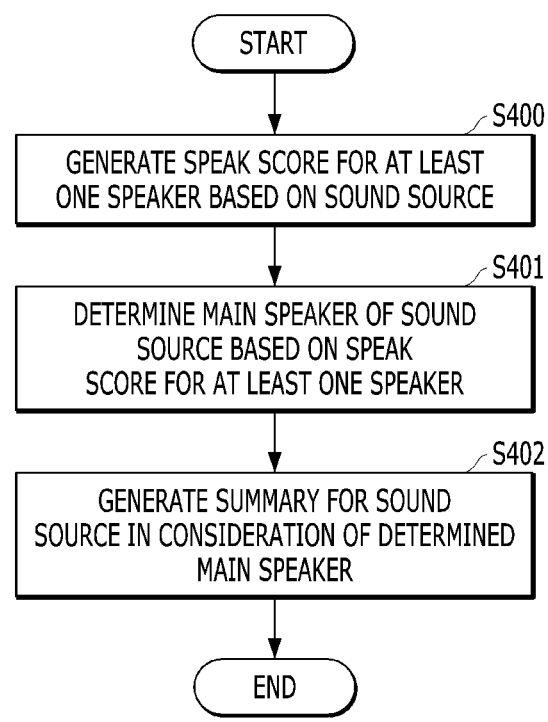
FIG. 4 is a flowchart illustrating a method of generating a summary based on a sound source and considering a main speaker according to the exemplary embodiment of the present disclosure.

Referring to FIG. 4, the method may include generating, by the processor 110, a speak score for at least one speaker based on a sound source (S400). In this case, the speak score may be determined for each speaker in the process of separating the speaker from the sound source (for example, a process using the VAD module). For example, the speak score may be determined to be proportional to the length of the speak and the frequency of speaks for each speaker in order to select a speaker with a relatively long length of the speak and a relatively frequent speak in the process of separating the speaker from the sound source. In order to implement the method, the operation S400 may include distinguishing, by the processor 110, a plurality of speakers associated with the sound source from each other, and calculating, by the processor 110, at least one of a frequency of speaks or a degree of dispersion of the speak for at least one speaker. For example, the processor 110 may remove noise from the sound source using the VAD module, and select at least one spread from the flow of the sound source (for example, a sound source having a playback time of X seconds) as a speak. Subsequently, the processor 110 may extract a feature for each selected speak by using the speaker separation module, and when the above features are illustrated in the latent space, the processor 110 may generate a cluster of the speak having relatively close features, and match each cluster to a different speaker. In this case, the processor 110 may match the speak belonging to the same cluster to the speak of the same speaker. Finally, the processor 110 may output a speak score by calculating the degree of density and the frequency of speaks for each speaker.

The method may include determining, by the processor 110, the main speaker of the sound source based on the speak score for said at least one speaker (S401). For example, the processor 110 may output a speak score based on the frequency of the speak and the degree of dispersion of speaks calculated for each speaker, and determine the speaker having the highest speak score as the main speaker. A detailed exemplary embodiment of the operation S401 will be described in detail later with the drawings.

The method may include generating, by the processor 110, a summary of the sound source in consideration of the determined main speaker (S402). For example, the processor 110 may assign weighted values to sentences related to the main speaker among sentences included in the sound source by using the neural network model, and generate a summary by extracting sentences to be included in the summary after assigning the weighted value. In addition, the processor 110 may assign weighted values to tokens or nodes corresponding to the speak associated with the determined main speaker among the speak included in the sound source by using the neural network model, and generate a summary by generating sentences by utilizing some tokens or nodes after assigning the weighted value. A detailed exemplary embodiment of the operation S402 will also be described in detail later with the drawings.

In short, the exemplary embodiment according to the method of the present disclosure following S400 to S402 may also be implemented as follows.

The method may include a process in which the processor 110 extracts a plurality of speak by using the VAD module based on a sound source, a process in which the processor 110 determines a speaker of the plurality of speaks by using the speaker separation module based on the plurality of speaks, a process in which the processor 110 extracts a script including the speaker and speak contents by using the STT module based on spreads corresponding to the speak in the sound source, a process in which the processor 110 generates a speak score based on at least one of the frequency of speaks or the degree of dispersion of the speak for each speaker obtained through the VAD module and the speaker separation module (that is, corresponding to operation S400), a process in which the processor 110 determines one of the speakers as a main speaker based on the speak score (that is, corresponding to operation S401), and finally, a process in which the processor 110 outputs a summary for the sound source in consideration of the main speaker (that is, corresponding to operation S402). Meanwhile, these processes are merely examples, and the method of generating the summary according to the exemplary embodiment of the present disclosure may be implemented in a form including various processes in addition to the processes.

Figure 5:
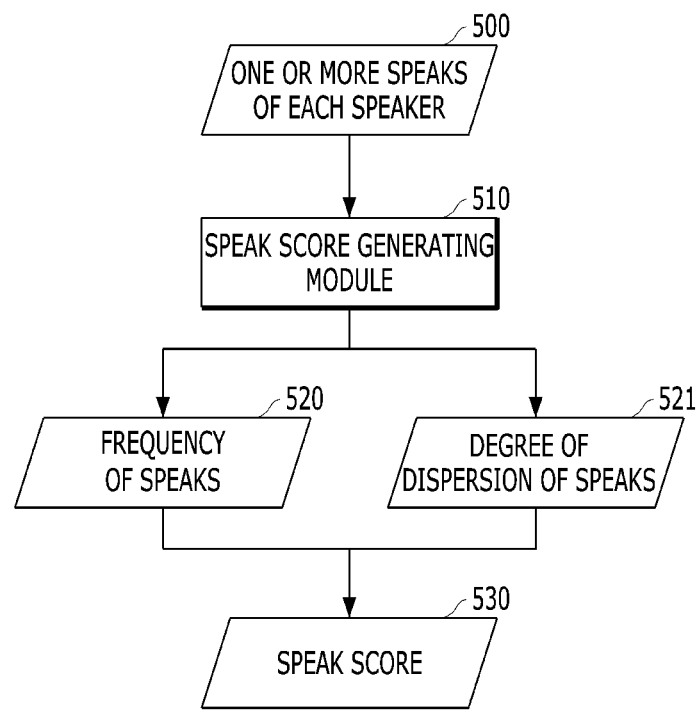
FIG. 5 is a schematic diagram illustrating a method of generating a speak score according to the exemplary embodiment of the present disclosure.

FIG. 5 is a schematic diagram illustrating a method of generating a speak score according to the exemplary embodiment of the present disclosure.

Hereinafter, embodiments of a method of calculating the frequency of speaks and the degree of dispersion of speaks and generating the speak score based on at least one of the frequency of speaks and the degree of dispersion of speaks in relation to the aforementioned operation S400 will be disclosed.

Referring to FIG. 5, in relation to "a method of calculating the frequency of speaks and generating a speak score based on the frequency of speaks" (hereinafter, a speak score generation exemplary embodiment-①), the processor 110 may generate the frequency 520 of speak by using a speak score generation module 510 based on one or more speaks 500 of each speaker. Subsequently, the processor 110 may generate a speak score 530 based on the frequency 520 of the speak. In this case, the speak score generation exemplary embodiment-① may further include, in relation to operation S400 performed by the processor 110, "calculating the number of clustered feature vectors", "calculating the frequency of speaks for each speaker based on the number of clustered feature vectors" and "generating a speak score for each speaker based on the calculated frequency of speaks (for example, the higher the frequency of speaks, the higher the speak scores)" as sub-operations.

In relation to "the method of calculating the degree of dispersion of speaks and generating the speak scores based on the degree of dispersion of speaks" (hereinafter, the speak score generation exemplary embodiment-②), the processor 110 may generate the degree of dispersion 521 of the speak by using the speak score generation module 510 based on one or more speak 500 of each speaker.

Subsequently, the processor 110 may generate the speak score 530 based on the degree of dispersion 521 of the speaks. The speak score generation exemplary embodiment-② may further include, in relation to "generating the speak score for at least one speaker", which is the sub-operation of operation S400, "calculating the degree of dispersion for one or more speaks of each speaker" and "generating a speak score for each speaker based on the calculated degree of dispersion of the speaks (for example, the higher the degree of dispersion of the speak, the higher the speak score)" as sub-operations. In this case, the calculating of the degree of dispersion for one or more speaks of each speaker may further include: identifying one or more speak indices for each speaker in a script generated based on the sound source; and calculating the degree of dispersion for one or more speaks of each speaker based on the identified one or more speak indices.

In relation to "the method of calculating the frequency and the degree of dispersion of the speak and generating the speak score based on both the frequency and the degree of dispersion of the speak" (hereinafter, the speak score generation exemplary embodiment-③), the processor 110 may generate the frequency 520 of speaks and the degree of dispersion 521 of the speaks by using the speak score generation module 510 based on one or more speaks 500 of each speaker.

Subsequently, the processor 110 may generate a speak score 530 based on the frequency 520 of the speaks and the degree of dispersion 521 of the speaks. In this case, in order to generate the speak score 530, the processor 110 may perform a computation, such as summing or averaging the frequency 520 of the speaks and the degree of dispersion 521 of the speaks, and in addition to the foregoing computation, various computations may be performed. Further, the speak score generation exemplary embodiment-③ may further include: calculating the frequency of speaks for each speaker in the sound source; calculating the degree of dispersion of speaks for each speaker in the sound source; and generating a speak score for each speaker based on a weighted value sum of the calculated frequency of the speak and degree of dispersion of the speak, as a sub-operation of generating the speak score for said at least one speaker.

Figure 6:
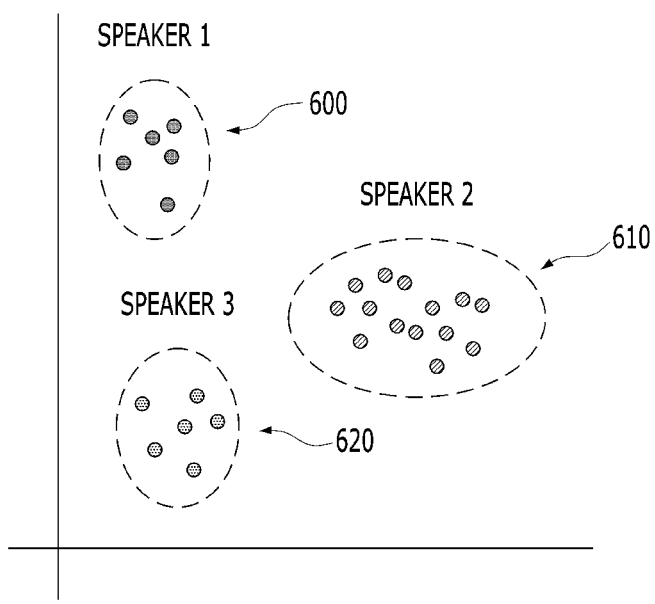
FIG. 6 is a schematic diagram illustrating a method of performing clustering according to the exemplary embodiment of the present disclosure.

FIG. 6 is a schematic diagram illustrating a method of performing clustering according to the exemplary embodiment of the present disclosure.

As mentioned above, the operation of generating, by the processor 110, the speak score for said at least one speaker may further include, distinguishing, by the processor 110, the plurality of speakers associated with the sound source from each other. In this case, the method of distinguishing a plurality of speakers from each other may include: extracting feature vectors for the speaks included in the sound source, and distinguishing the plurality of speakers based on the clustering of the extracted feature vectors. Further, the clustering is to classify the speaks with high similarity into the same cluster by analyzing the similarity of vectors of each speak in the latent space (that is, the speaks included in each cluster are characterized by high similarity and low heterogeneity), and finally to classify the speaks into at least one cluster, and in the exemplary embodiment of the present disclosure, the clustering may be performed based on a VAD neural network model, such as UIS-RNN, agglomerative hierarchical clustering, and spectral clustering.

For example, referring to FIG. 6, it can be seen that points corresponding to the feature vectors of each speak included in the sound source are illustrated in the latent space. In this case, the speaks illustrated in the latent space may be classified into clusters, such as speaker 1, speaker 2, speaker 3 . . . , and speaker N, based on similarity and heterogeneity predetermined by the processor 110. That is, the processor 110 may classify the speaker of each speak (for example, the speaker classification module) based on similarity and heterogeneity. In particular, in the case of speaker 2 610 (the cluster classified as speaker 2), since there are many classified speaks compared to speaker 1 600 and speaker 3 620, so when the processor 110 determines the speak score based on the frequency of speaks, the speak score of speaker 2 may be measured as the highest (based on the number of speaks of speaker N/total number of speaks, the speak score is the largest when N is 2).

Figure 7:
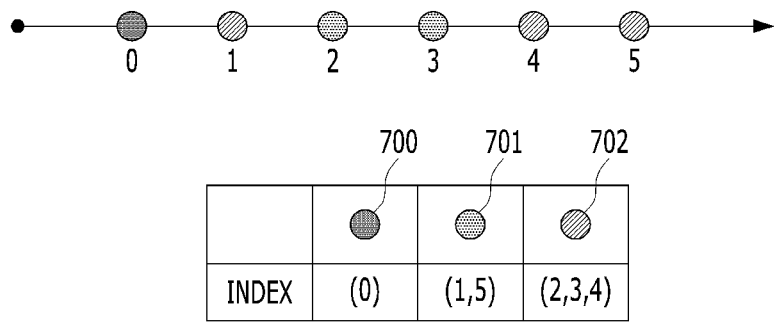
FIG. 7 is a schematic diagram illustrating an exemplary embodiment of calculating a dispersion degree of speak of each speaker by using an index of the speak according to the exemplary embodiment of the present disclosure.

FIG. 7 is a schematic diagram illustrating an exemplary embodiment of calculating a dispersion degree of a speak of each speaker by using an index of the speak according to the exemplary embodiment of the present disclosure.

Referring to FIG. 7, the calculating of the degree of dispersion for one or more speaks of each speaker may further include: identifying one or more speak indices for each speaker in a script generated based on the sound source; and calculating the degree of dispersion for one or more speaks of each speaker based on the identified one or more speak indices. For example, the processor 110 may recognize an index indicating the order of each speak with respect to the speaks of which the speaker is classified by the clustering process. In this case, the speaks may be classified into 'N' types of speakers according to the clustering result, and the identified indexes are speaker 1 700="(0)", speaker 2 701="(2, 3)", speaker 3 702="(1, 4, 5)". In this case, it can be said that "(1, 4, 5)" corresponding to the speak of speaker 3 702 has the highest degree of dispersion compared to those of speakers 1 and 2. As the degree of dispersion of speaks of a specific speaker is higher, the speak score may be higher, so that speaker 3 702 may have the highest speak score compared to speaker 1 700 and speaker 2 701.

As discussed above, in the method for generating the summary according to the exemplary embodiment of the present disclosure, since the processor 110 determines the main speaker based on the frequency of speaks and the dispersion degree of speaks obtainable in the process of recognizing the speaks from the sound source and classifying the speakers, compared to the methods in the related art, the main speaker may be determined without additional data input. For example, when the method is used in a meeting in which a large number of participants participate, the main speaker may be determined without user intervention, and a summary may be generated by reflecting the content of the speak of the main speaker.

On the other hand, as mentioned above, the operation of generating the summary of the sound source in consideration of the determined main speaker may include assigning a weighted value to the speaks related to the determined main speaker among the speaks included in the sound source and generating a summary for the sound source.

According to the exemplary embodiment of the present disclosure, the generating of the summary for the sound source may be implemented based on the neural network model, and a generative summary method, an extractive summary method, and the like may be used.

Here, the generative summary method may include operations of generating sentences to be included in the summary based on the analysis in the token unit. For example, the generative summary method may include operations of analyzing the speaks included in the sound source in token units, assigning weighted values the tokens associated with the main speaker, selecting some tokens in consideration of the assigned weighted value, and generating a sentence to be included in the summary based on the selected tokens. Meanwhile, the token may be generated by dividing the text generated based on the sound source, and may be implemented in various forms, such as chunk units, morpheme units, word units, phrase units, and clause units. Additionally, the generative summary method may include operations of generating sentences to be included in the summary based on the analysis in node units of a language graph. For example, the generative summary method may include operations of analyzing the sound source by using a language graph including a plurality of nodes and edges, assigning weighted values to the nodes associated with the main speaker, selecting some nodes in consideration of the assigned weighted value, and generating a sentence to be included in the summary based on the selected nodes.

The extractive summary method may include operations of generating a summary by extracting some of the sentences included in the sound source (without directly generating the sentences to be included in the summary based on the analysis in the token or node unit). For example, the extractive summary method may include identifying sentences by converting the speaks included in the sound source into text, assigning weighted values to sentences related to the main speaker, extracting some sentences in consideration of the assigned weighted value, and generating a summary by using the extracted sentences.

According to the exemplary embodiment of the present disclosure, the generating of the summary for the sound source may be implemented based on the neural network model, and various learning methods, such as a supervised learning method and an unsupervised learning method, may be used. For example, the operation of generating the summary for the sound source may be implemented by using "a neural network model by a supervised learning method in which the neural network model is trained by using a script and a summary generated based on the script (that is, a summary that becomes the ground-truth of the sound source) ", "a neural network model by an unsupervised learning method in which the neural network model is trained without correct answer data", and the like. On the other hand, when the summary for the sound source is generated based on the neural network model by the unsupervised learning method, a method of identifying a keyword included in the sound source and generating the summary in consideration of the identified keyword may be utilized. This is because, when the keyword-based unsupervised learning method is used, the quality of the summary may be improved.

Figure 8:
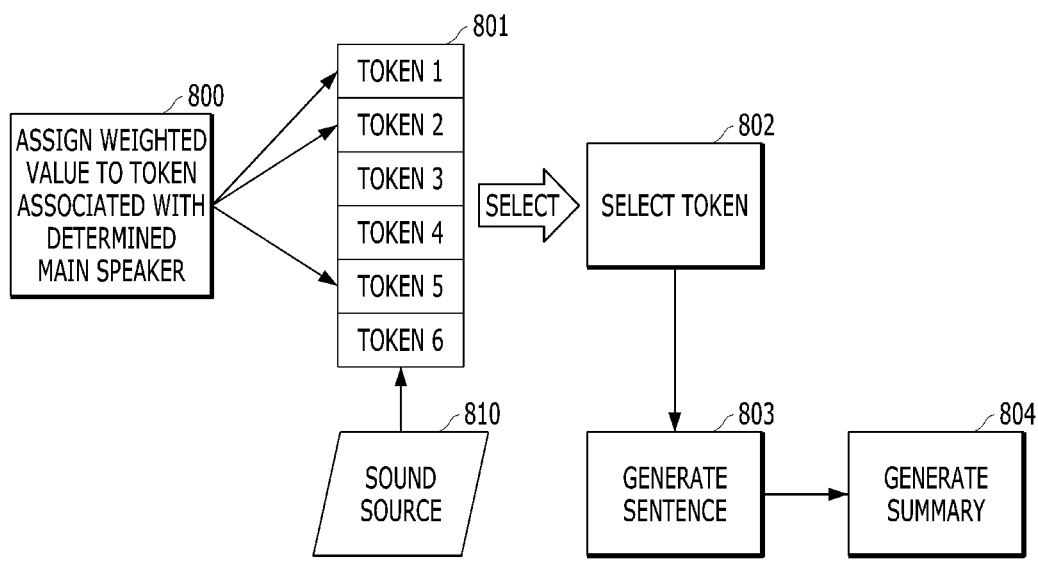
FIG. 8 is a schematic diagram illustrating the first method of generating a summary by assigning a weighted value to a main speaker based on a sound source according to the exemplary embodiment of the present disclosure.
Figure 9:
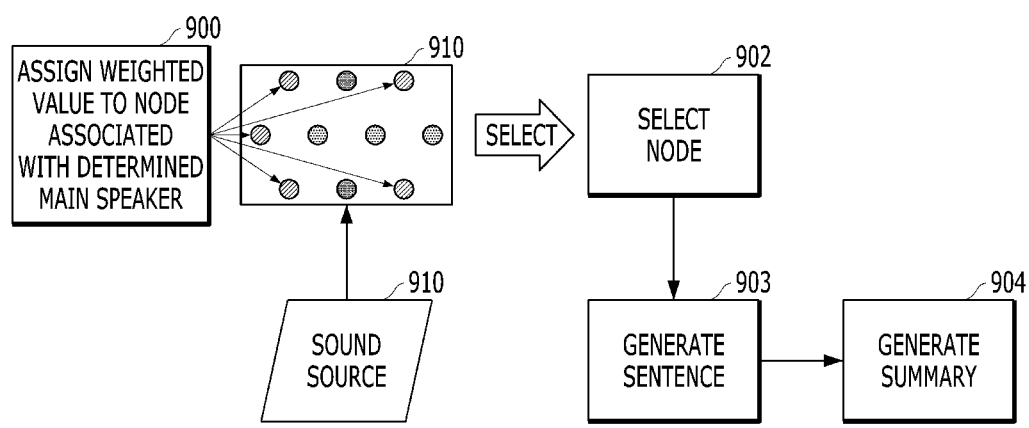
FIG. 9 is a schematic diagram illustrating the second method of generating a summary by assigning a weighted value to a main speaker based on a sound source according to the exemplary embodiment of the present disclosure.
Figure 10:
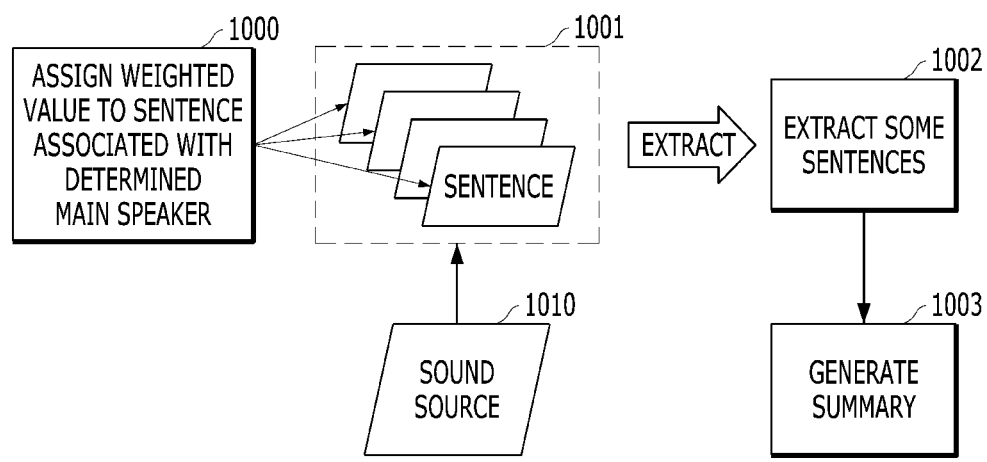
FIG. 10 is a schematic diagram illustrating the third method of generating a summary by assigning a weighted value to a main speaker based on a sound source according to the exemplary embodiment of the present disclosure.

From now on, with reference to FIGS. 8 to 10, three representative exemplary embodiments of "a method of generating a summary by assigning a weighted value to a main speaker based on a sound source" are disclosed (however, the method of generating a summary by assigning a weighted value to a main speaker based on a sound source is not limited thereto, and may be implemented in various ways).

FIG. 8 is a schematic diagram illustrating the first method of generating a summary by assigning a weighted value to a main speaker based on a sound source according to the exemplary embodiment of the present disclosure.

The first method may include a process in which the processor 110 extracts tokens from the received script or sound source, and assigns a weighted value to the probability that a token corresponding to the speak of the main speaker is selected to generate a summary (that is, the generative summary method). Here, the token may be generated by dividing texts generated based on the sound source, and may be implemented in various forms, such as a chunk unit, a morpheme unit, a word unit, a phrase unit, and a clause unit.

Specifically, referring to FIG. 8, the first method may include: an operation of converting, by the processor 110, a plurality of tokens 801 from a sound source 810 and obtaining the converted tokens 801; an operation 800 of assigning, by the processor 110, weighted values to tokens corresponding to the speak associated with the determined main speaker; an operation 802 of selecting, by the processor 110, some tokens from among the plurality of tokens in consideration of the weighted value; an operation 803 of generating, by the processor 110, a sentence to be included in the summary based on the selected some tokens; and an operation 804 of generating, by the processor 110, the summary based on the generated sentence by using the neural network model. In this case, the processor 110 may utilize the neural network model in the process of implementing the above operations. In addition, the neural network model may include various types of models including a text auto-encoder, a transformer, a neural network model for example, Bidirectional Encoder Representations from Transformers (BERT), Bidirectional and Auto-Regressive Transformers (BART), and the like) derived from a transformer. In the first method, the summary is generated based on the sound source, but the quality of the summary may be improved by effectively considering the token corresponding to the speak of the main speaker.

FIG. 9 is a schematic diagram illustrating the second method of generating a summary by assigning a weighted value to a main speaker based on a sound source according to the exemplary embodiment of the present disclosure.

The second method may include: extracting, by the processor 110, a language graph including nodes in the chunk or word units from the received script or sound source, and assigning a weighted value to the probability that a node corresponding to the speak of the main speaker is selected to generate the summary (that is, the generative summary method).

Specifically, referring to FIG. 9, the second method may include: an operation of obtaining, by the processor 110, a language graph 901 including a plurality of nodes based on the sound source; an operation 900 of assigning, by the processor 110, weighted value to the node corresponding to the speak associated with the determined main speaker; an operation 902 of considering, by the processor 110, the weighted value and selecting some nodes among the plurality of nodes; an operation 903 of generating, by the processor 110, a sentence to be included in the summary based on the selected some nodes; and an operation 904 of generating, by the processor 110, the summary based on the generated sentence. In this case, the processor 110 may utilize the neural network model in the process of implementing the above operations. Also, the neural network model may correspond to a graph-based neural network model, such as GNN. In the second method, the summary is generated based on the sound source, but the quality of the summary may be improved by effectively considering the node (that is, the word or the sentence) corresponding to the speak of the main speaker.

FIG. 10 is a schematic diagram illustrating the third method of generating a summary by assigning a weighted value to a main speaker based on a sound source according to the exemplary embodiment of the present disclosure.

The third method may include a process of generating (that is, the extractive summary method) a summary by assigning weighted value to the probability that the processor 110 extracts sentences from the received script or sound source.

Specifically, referring to FIG. 10, the third method may include: converting, by the processor 110, the sound source 1010 into a plurality of sentences; an operation 1000 of assigning, by the processor 110, weighted values to sentences corresponding to the speaks associated with the determined main speaker; an operation 1002 of extracting, by the processor 110, some sentences from among the plurality of sentences in consideration of the weighted value; and an operation 1003 of generating, by the processor 110, the summary based on the extracted sentences. In this case, the processor 110 may utilize the neural network model in the process of implementing the above operations. In the third method, the summary is generated based on the sound source, but the quality of the summary may be improved by effectively extracting the sentence corresponding to the speak of the main speaker.

Figure 11:
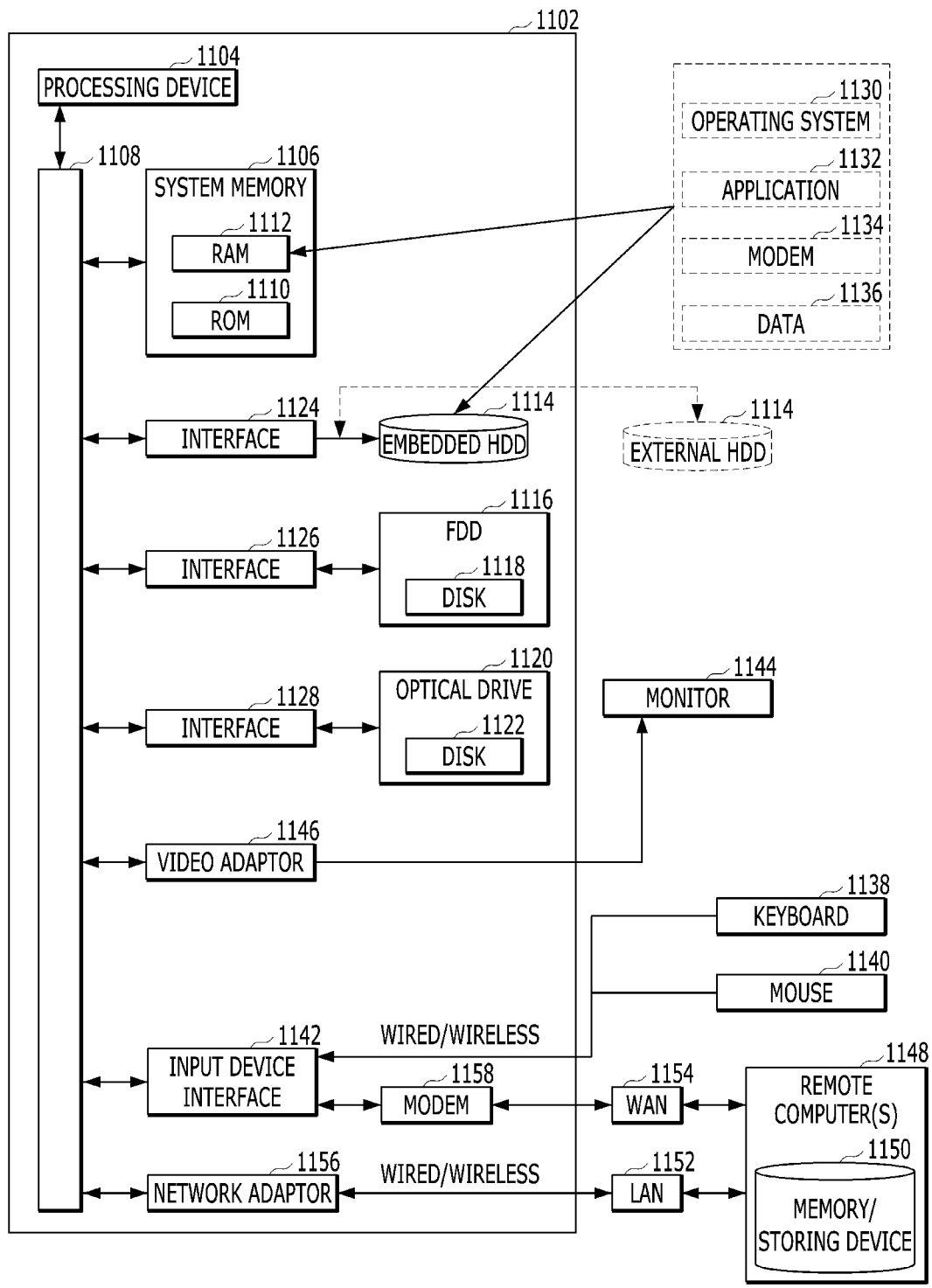
FIG. 11 is a simple and general schematic diagram illustrating an example of a computing environment in which exemplary embodiments of the present disclosure are implementable.

FIG. 11 is a simple and general diagram for an example of a computing environment in which the exemplary embodiments of the present disclosure may be implemented.

The present disclosure has been generally described in relation to a computer executable command executable in one or more computers, but those skilled in the art will appreciate well that the present disclosure is combined with other program modules and/or be implemented by a combination of hardware and software.

In general, a program module includes a routine, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. A computer accessible medium may be a computer readable medium regardless of the kind of medium. The computer readable medium includes volatile and non-volatile media and transitory and non-transitory media, and portable and non-portable media. As a non-limited example, the computer readable medium may include a computer readable storage medium and a computer readable transport medium. The computer readable storage medium includes volatile and non-volatile media, transitory and non-non-transitory media, and portable and non-portable media constructed by a predetermined method or technology, which stores information, such as a computer readable command, a data structure, a program module, or other data. The computer storage medium includes a read only memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routine helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of computer readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may include a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adapter 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a workstation, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adapter 1156. The adapter 1156 may make wired or wireless communication to the LAN 1152 easy, and the LAN 1152 may also include a wireless access point installed therein for the communication with the wireless adapter 1156. When the computer 1102 is used in the WAN networking environment, the computer 1102 may include a modem 1158, or includes other means connected to a communication computing device in the WAN 1154 or setting communication through the WAN 1154 via the Internet and the like. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electromagnetic fields or particles, optical fields or particles, or a predetermined combination thereof.

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program or a medium accessible from a predetermined computer-readable device. For example, the computer-readable medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

What is claimed is:

1. A method of generating a summary for a sound source data, the method being performed by at least one computing device, the method comprising:
    generating a speak score for at least one speaker based on the sound source data, based on a weighted value sum of at least one of a degree of dispersion of the speak or a frequency of the speak of the speaker, wherein the frequency of the speak is determined by:
        removing noise from the sound source data using a VAD module, wherein the VAD module receives the sound source and repeats a binary classification algorithm in which, when the speak of the speaker is recognized at a predetermined interval of the sound source, the VAD module outputs a numerical progression and wherein the VAD module further includes a probability distribution-based classification algorithm for determining whether the distribution is similar to the speak or the noise based on the distribution of the speak and the distribution of the noise;
        extracting a plurality of feature vectors for the speaks included in the sound source data, wherein the feature vectors represent data points within the latent space that encapsulates the characteristics of the speak;
        analyzing each of the plurality of feature vectors for similarities;
        clustering each of the plurality of feature vectors based on the analyzed similarities;
        distinguishing the plurality of speakers from each other based on the clustered feature vectors corresponding to each of the speaks; and
    wherein the degree of dispersion of the speak is determined by:
        identifying one or more speak indices for each of the at least one speaker based on the sound source data; and
        calculating the degree of dispersion for the speaks of each speaker based on the identified one or more speak indices;
    determining a main speaker of the sound source data based on the speak score for said at least one speaker; and
    generating the summary for the sound source data in consideration of the determined main speaker.

2. The method of claim 1, wherein the calculating of the degree of dispersion for one or more speaks of each speaker further includes:
    identifying one or more speak indices for each speaker in a script generated based on the sound source data; and
    calculating the degree of dispersion for one or more speaks of each speaker based on the identified one or more speak indices.

3. The method of claim 1, wherein the generating of the speak score for said at least one speaker further includes distinguishing a plurality of speakers associated with the sound source data from each other.

4. The method of claim 1, wherein the generating of the summary for the sound source data in consideration of the determined main speaker includes generating the summary of the sound source data by assigning a weighted value to the speaks associated with the determined main speaker among the speaks included in the sound source data.

5. The method of claim 4, wherein the sound source data is converted into a plurality of tokens, and
    the generating of the summary of the sound source data by assigning the weighted value to the speak associated with the determined main speaker further includes:
    assigning a weighted value to the token associated with the determined main speaker;
    selecting some tokens from among the plurality of tokens in consideration of the weighted value;

generating a sentence to be included in the summary based on the selected some tokens; and
generating the summary based on the generated sentence.

6. The method of claim 4, wherein the sound source data is converted into a language graph including a plurality of nodes, and
the generating of the summary of the sound source data by assigning the weighted value to the speak associated with the determined main speaker further includes:
assigning a weighted value to a node associated with the determined main speaker;
selecting some nodes from among the plurality of nodes in consideration of the weighted value;
generating a sentence to be included in the summary based on the selected some nodes; and
generating the summary based on the generated sentence.

7. The method of claim 4, wherein the sound source data is converted into a plurality of sentences, and
the generating of the summary of the sound source data by assigning the weighted value to the speak associated with the determined main speaker further includes:
assigning a weighted value to a sentence associated with the determined main speaker;
extracting some sentences from among the plurality of sentences in consideration of the weighted value; and
generating the summary based on the extracted some sentences.

8. A device, comprising:
at least one processor; and
a memory,
wherein the processor is configured to:
generate a speak score for at least one speaker based on a sound source data, based on a weighted value sum of at least one of a degree of dispersion of the speak or a frequency of the speak of the speaker;
wherein the frequency of the speak is determined by:
removing noise from the sound source data using a VAD module, wherein the VAD module receives the sound source and repeats a binary classification algorithm in which, when the speak of the speaker is recognized at a predetermined interval of the sound source, the VAD module outputs a numerical progression and wherein the VAD module further includes a probability distribution-based classification algorithm for determining whether the distribution is similar to the speak or the noise based on the distribution of the speak and the distribution of the noise;
extracting a plurality of feature vectors for the speaks included in the sound source data, wherein the feature vectors represent data points within the latent space that encapsulates the characteristics of the speak;
analyzing each of the plurality of feature vectors for similarities;
clustering each of the plurality of feature vectors based on the analyzed similarities;
distinguishing the plurality of speakers from each other based on the clustered feature vectors corresponding to each of the speaks; and
wherein the degree of dispersion of the speak is determined by:
identifying one or more speak indices for each of the at least one speaker based on the sound source data; and
calculating the degree of dispersion for the speaks of each speaker based on the identified one or more speak indices;
determine a main speaker of the sound source data based on the speak score for said at least one speaker; and
generate a summary for the sound source data in consideration of the determined main speaker.

9. A computer program stored in a non-transitory computer-readable storage medium, the computer program causing at least one processor to perform operations for generating a summary for a sound source, the operations comprising:
an operation of generating a speak score for at least one speaker based on a sound source data, based on a weighted value sum of at least one of a degree of dispersion of the speak or a frequency of the speak of the speaker;
wherein the frequency of the speak is determined by:
removing noise from the sound source data using a VAD module, wherein the VAD module receives the sound source and repeats a binary classification algorithm in which, when the speak of the speaker is recognized at a predetermined interval of the sound source, the VAD module outputs a numerical progression and wherein the VAD module further includes a probability distribution-based classification algorithm for determining whether the distribution is similar to the speak or the noise based on the distribution of the speak and the distribution of the noise;
extracting a plurality of feature vectors for the speaks included in the sound source data, wherein the feature vectors represent data points within the latent space that encapsulates the characteristics of the speak;
analyzing each of the plurality of feature vectors for similarities;
clustering each of the plurality of feature vectors based on the analyzed similarities;
distinguishing the plurality of speakers from each other based on the clustered feature vectors corresponding to each of the speaks; and
wherein the degree of dispersion of the speak is determined by:
identifying one or more speak indices for each of the at least one speaker based on the sound source data; and
calculating the degree of dispersion for the speaks of each speaker based on the identified one or more speak indices;
an operation of determining a main speaker of the sound source data based on the speak score for said at least one speaker; and
an operation of generating the summary for the sound source data in consideration of the determined main speaker.

* * * * *